United States Patent [19]

Saeger

[11] Patent Number: 4,763,442
[45] Date of Patent: Aug. 16, 1988

[54] PLANT PROPAGATOR

[75] Inventor: Edwin A. Saeger, Pittsburgh, Pa.

[73] Assignee: University of Pittsburgh, Pittsburgh, Pa.

[21] Appl. No.: 359,210

[22] Filed: Mar. 17, 1982

[51] Int. Cl.⁴ .................................................. H01G 31/00
[52] U.S. Cl. .................................................................. 47/63
[58] Field of Search ............ 47/63, 58, 73, 66, DIG. 3

[56] References Cited

U.S. PATENT DOCUMENTS

| | | | |
|---|---|---|---|
| Re. 21,820 | 6/1941 | Munsell | 47/63 |
| 1,548,283 | 8/1925 | Respess | 47/73 |
| 1,634,727 | 7/1927 | Roy | 47/73 |
| 1,994,962 | 3/1935 | Rushfeldt | 47/DIG. 3 |
| 2,600,718 | 6/1952 | Wilson | 47/63 |
| 3,131,510 | 5/1964 | Engstorm | 47/DIG. 3 |
| 3,458,951 | 8/1969 | Martin | 47/60 |
| 3,841,021 | 10/1974 | Ferrand | 47/66 |
| 4,031,832 | 6/1977 | Edwards | 111/4 |
| 4,159,597 | 7/1979 | Olsen | 47/58 |
| 4,192,096 | 3/1980 | Platt et al. | 47/73 |
| 4,216,621 | 8/1980 | Olsen et al. | 47/73 |
| 4,231,189 | 11/1980 | Hochberg | 47/83 |
| 4,248,014 | 2/1981 | Williames | 47/86 |

OTHER PUBLICATIONS

Water, The Yearbook of Agriculture, The U.S. Dept. of Agriculture, 1955, pp. 322-323.

*Primary Examiner*—Robert A. Hafer
*Attorney, Agent, or Firm*—Arnold B. Silverman

[57] ABSTRACT

A method and apparatus for growing a number of plants from cuttings, in a limited space, while mechanically resisting root entanglement. Tubes are placed in a container into which water is added. Plant cuttings are placed individually into the tubes such that the leaf portion of each plant is supported by a tube and the stem portion is suspended in water inside the tube. When roots develop, a growing medium may be added to prolong root growth or the plant may be removed from the tube for permanent planting. Methods of root growth stimulation are also disclosed.

3 Claims, 1 Drawing Sheet

PLANT PROPAGATOR

BACKGROUND OF THE INVENTION

1. Field of the Invention

This invention relates to a method and apparatus for growing plants from cuttings. More specifically, the invention, by providing a physical barrier, resists root entanglement both during water sprouting and after the addition of soil, while using a minimum of space.

2. Description of the Prior Art

In the past, various devices have been created to facilitate the growing of plants. U.S. Pat. No. 2,600,718 discloses a sprouting apparatus which can accommodate a number of plant stems whose leaves are supported by vertical transparent tubes disposed in a V-shaped channel. The device provides a means for maintaining a sufficient water level to keep the stems submerged, but the problem of root entanglement is not addressed. The only way to prevent root entanglement with this type of device is to provide large spaces between the tubes, which reduces the yield for a given area. Additionally, this device does not contemplate the later addition of soil.

U.S. Pat. No. 3,131,510 discloses a device for starting plants from leaves or slips which hold the leaf part of the slip above water while the stem portion is submerged. The essence of this invention is a horizontal disk removably mounted on a water-filled receptacle. The disk contains a number of triangular holes large enough to permit the stem, but not the leaf, to pass through, thereby suspending the stem in the water. The usefulness of this device ceases when the plant requires soil. Also, the problem of root entanglement is not addressed.

A solution to root entanglement between individual containers tightly packed in a cardboard box is suggested in U.S. Pat. No. 4,159,597. The use of cardboard dividers arranged in a grid pattern to isolate the individual containers is disclosed. This solution is limited, however, to its intented application and would not be effective when water sprouting is employed.

There remains, therefore, a need for a plant propagator which can effectively prevent root entanglement in water sprouting applications, and which does not require inefficient spacing between plants. There also remains a need for a plant growing method and apparatus which contemplate the later addition of soil to the container used for sprouting.

SUMMARY OF THE INVENTION

The present invention has produced a solution to the above needs by providing a plant propagator in which each plant cutting has its own container, thereby eliminating injury to the roots due to entanglement. Additionally, soil can be added for prolonging plant growth until permanent planting is desired.

More specifically, a plurality of tubes are placed in a container into which water is added. Individual plant cuttings are placed into at least some of the tubes such that the leaf portion of each plant is supported by a tube and the stem portion is suspended in water inside the tube. After the plant cuttings develop a root system, they can either be planted directly in the desired location or a suitable growing medium can be added to each tube after the water is removed from the container.

It is an object of the present invention to provide a method and apparatus for rooting plant cuttings which resists root entanglement by placing hollow tubes into a container and placing a plant cutting into each tube.

It is another object of the present invention to prolong root growth after the roots have formed but prior to permanent planting by draining water from the container and adding soil to each tube.

It is another object of the present invention to add a sufficient amount of calcium to absorb the fluoride which is present in many city water supplies.

It is yet another object of the present invention to add a weak solution of fertilizer and/or a willow extract or other materials to the water to stimulate root growth.

It is yet another object of the present invention to resist undesired root entanglement of a large number of plants stored in a relatively small area.

These and other objects of the invention will be fully understood from the following description of the invention, on reference to the illustrations appended hereto.

DESCRIPTION OF THE PREFERRED EMBODIMENTS

Figure 1:
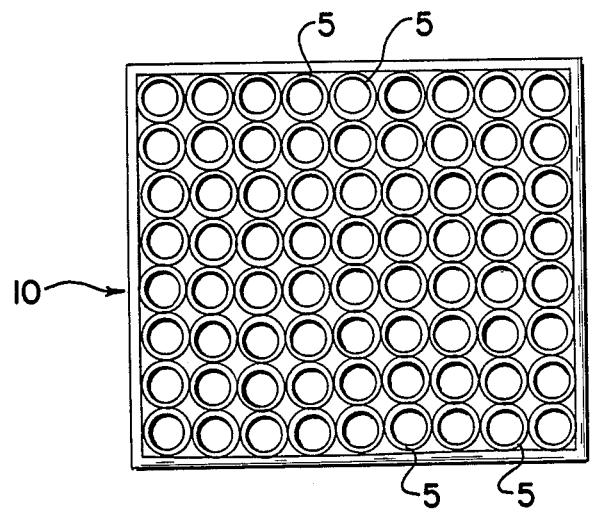
FIG. 1 is a top plan view of one form of the apparatus of the invention.
Figure 2:
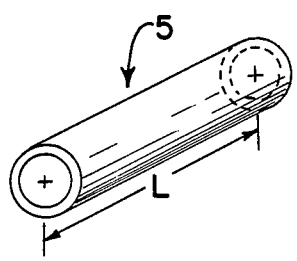
FIG. 2 is a perspective view of one form of the tube employable in the present invention.
Figure 3:
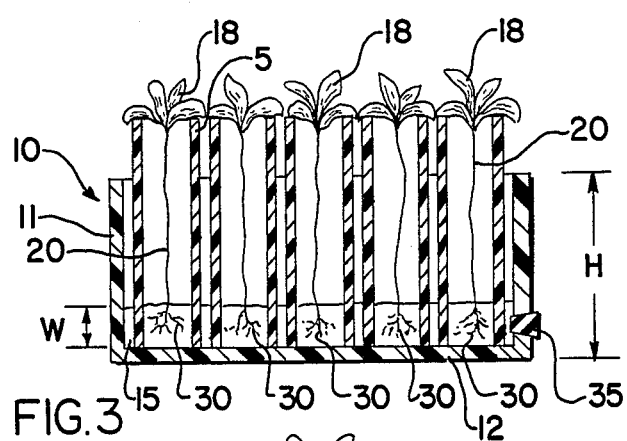
FIG. 3 is a partially schematic, cross-sectional view of a form of apparatus of the invention.

Referring specifically to FIGS. 1 through 3 the present invention provides a container 10 which can have any convenient shape. The container 10 has a base portion 12 and generally vertical side walls 11 and can be made from any rigid non-porous material. It is preferable to make the container out of glass or plastic as opposed to certain types of metal which might rust or corrode and possibly retard or inhibit plant growth. Into container 10 are placed a desired number of elongated tubes 5. It is preferred but not required to form tubes 5 out of a semi-rigid plastic. Each tube 5 will be hollow and open on each end and generally cylindrical but it is contemplated that a round, square or any other desired cross-sectional shape will adaquately serve the tubes function. I prefer to use a round tube for reasons that will become apparent. As shown in FIG. 1, it is preferred to pack the tubes 5 in intimate contact within container 10.

Two factors must be considered when choosing a proper sized tube 5 for a plant cutting 18. The tube's diameter must be smaller than the circumference of the plant leaves 18 in order for the tube 5 to support the plant. Also, the length of the plant's stem 20 together with the knowledge of whether the plant's roots 30 tend to grow more downwardly or radially outwardly will determine the height of the tube 5. I prefer to have the tube at least 3 to 3.5 centimeters longer than the plant's stem 20 in order provide sufficient room for root growth. For most plant types I prefer to have stems 20 equally submerged at a given water level in the container 10. It is also preferred that the tube length L be about 110 to 120 percent of the height of container 10 to provide the plant's leaves free access to light and air. Plastic tubes can easily be cut to the desired length.

After the proper sized tubes 5 are selected and placed into container 10, water 15 can be added to the container to the level W, for example, as shown in FIG. 3. It is to be understood that the water 15 could also be added prior to placing the tubes 5 into the container 10. The depth W of the water will depend on the length of the plants stems 20 generally equally submerged. Although, with some plants the amount of the stem 20 required to be under water is critical, most plants require only that some portion of the stem be submerged. Note that soft stem plants may rot if submerged too deeply. Impatiens, for example, seems to root the best with approximately 1.5 centimeters of its stem submerged.

At any convenient time in this process, the plant cuttings are placed, preferably one per tube 5, into at least some of tubes 5 such that each cutting is suspended in a tube supported by it leaves 18 or the stem base may rest on the base 12 submerged as shown.

After a plant cutting is in a tube 5 with its lower end submerged in water 15 one must wait for the plant cutting to develop roots 30. The present invention contemplates various ways which may help to stimulate root growth. If city water is used, allowing it to stand overnight may help to dissipate much of the chlorine gas present in the water. The addition of calcium to absorb any fluoride present is also recommended since fluoride has been shown to be harmful to some plants. A weak solution of fertilizer may also help to stimulate root growth as may the addition of a "willow rooting substance". A willow rooting substance can be obtained by placing cut up current year willow shoots into a vessel and covering the shoots with water and a lid for approximately twenty-four hours. The liquid obtained can be added to the container 10 as desired. Finally, plant hormones may increase the root promoting effect.

Once the plant cuttings have developed the desired roots 30 they can either be removed from the tubes 5 for transplanting or can be held until permanent planting is desired.

If holding the plants is desired the water 15 must be removed from container 10. This can be accomplished by pouring or by providing a drain opening 35 having a suitable plug in container 10 for this purpose.

Figure 4:
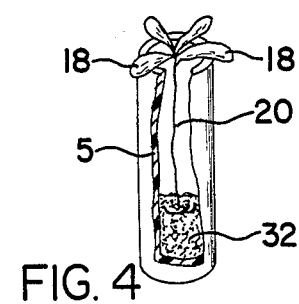
FIG. 4 is a partially broken away view of a tube showing a plant and soil contained therein.

After the water 15 removed, soil 32 or any other suitable growing medium may be added to tubes 5 as shown in FIG. 4 and the tubes 5 restored to container 10. When soil 32 is added it is preferable to keep the plant's roots 30 generally in the center of the tube 5 and some distance away from the base to allow room for continued root growth. The plants can be held in the soil 32 until permanent planting is desired, at which time each plant along with its roots and soil plug is removed from the tube 5 and planted.

By using the above described method and apparatus for growing plants from cuttings, the problem of root entanglement between adjoining plants is eliminated with no appreciable loss of growing space, as the tubes 5 can be tightly packed in the container 10.

While I have shown and described certain presently preferred embodiments of the invention and have illustrated a present preferred method of practicing the same it is to be understood that the invention is not limited thereto but may be otherwise variously embodied within the scope of the following claims.

I claim:

1. A method of rooting plant cuttings comprising the steps of:
   placing a plurality of tubes into a container,
   supporting an end of said tubes by the base of said container,
   maintaining said supported ends of said tubes substantially fully open to permit free entry of water into same from said container and withdrawal of water from said tubes into said container,
   at least partially filling said container with water,
   placing a plant cutting into at least some of said tubes with a portion of the plant's stem submerged in said water and at least some of said plant's leaves projecting above the upper end of said tubes,
   waiting until said plant cuttings develop roots,
   removing water from said container and tubes after said plant cutting has developed the desired roots,
   filling a portion of said tubes with a growing medium,
   holding the plants in said tubes until transplanting is desired, and
   removing each plant along with its roots and growing medium from each of said tubes for transplanting, whereby undesired root entanglement is resisted regardless of the density of packing of said tubes in said containers.

2. A method of rooting plant cuttings according to claim 1 further comprising the steps of:
   removing fluoride from said water, and
   adding fertilizer to said water.

3. The method of rooting plant cuttings according to claim 1 including supporting said cutting on said tube by said leaves.

* * * * *